March 31, 1931.　　　C. GROSS　　　1,798,324
GRADE FINDING INSTRUMENT
Filed March 5, 1930
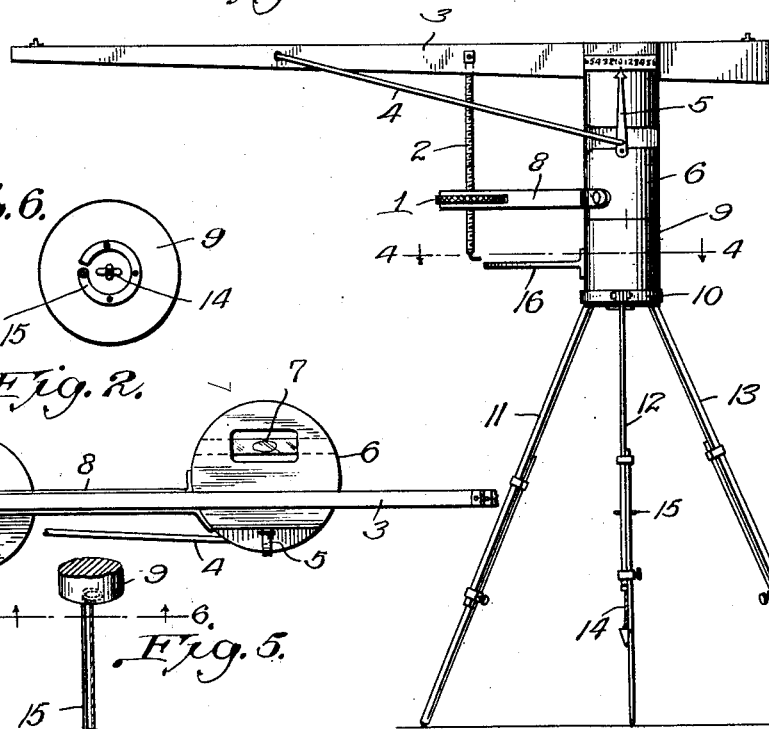
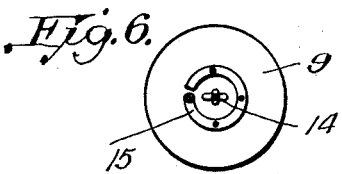
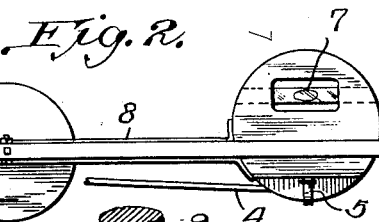
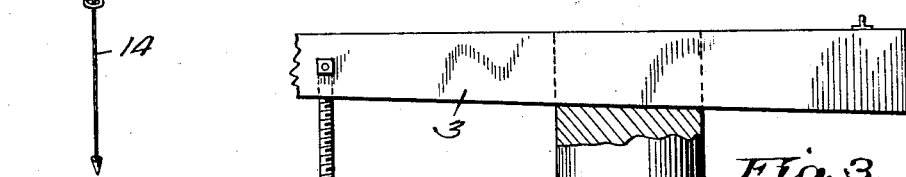
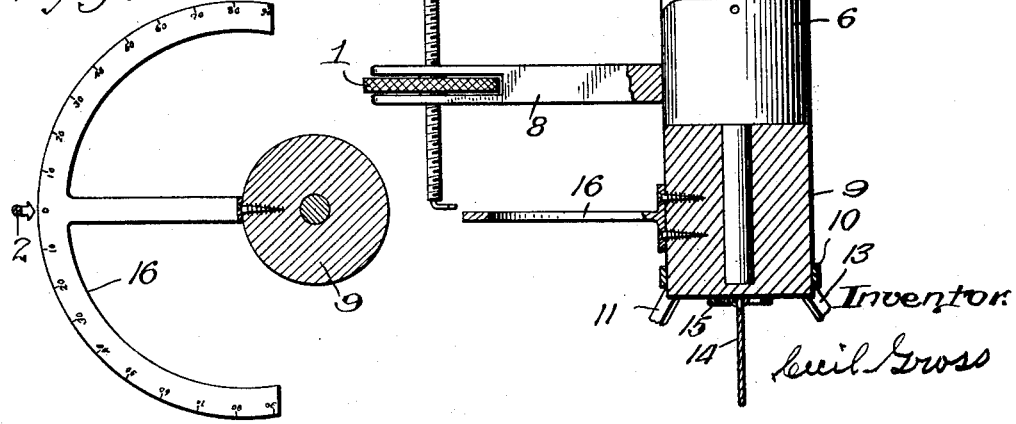
Inventor
Cecil Gross Patented Mar. 31, 1931

1,798,324

UNITED STATES PATENT OFFICE

CECIL GROSS, OF ELKINS, WEST VIRGINIA

GRADE-FINDING INSTRUMENT

Application filed March 5, 1930. Serial No. 433,416.

My invention relates to improvements in an instrument that can be operated to quickly and easily find and locate a grade for a logging railroad or grade for any other road or railroad desired, and it consists in the combinations, constructions and arrangements herein described and claimed.

An object of the invention is the provision of an instrument of the character described which affords facilities for making use of a small force of men to lay out the grade for a logging railroad or other roads needed in any operation.

Other objects and advantages of the invention will be apparent from the following description with the accompanying drawings in which:

Fig. 1 is the side elevation of the instrument.

Fig. 2 is top view of head and sight lever.

Fig. 3 is side view of head, thumbnut, screw, one half of body.

Fig. 4 is circle to show degree of curve.

Fig. 5 is plumbbob, string and guide.

Fig. 6 is bottom of body.

A full description of the instrument and the working thereof is herein described so that it can be used and operated successfully by anyone capable to have charge of a grading crew or other jobs of like nature.

Working description

After the instrument is set level by the level bulb the thumbnut 1 is turned so the indicator points to 0 in center of dial which shows that the sight lever is level. Then to get the right grade, turn the thumbnut 1 which as it is turned moves the screw 2, which operates the sight lever 3, moving it up or down to get the desired grade; as the sight lever is moved this operates the connecting rod 4 that is connected to the pointer 5 which as thumbnut 1 is turned, moves the pointer 5 to the figures on the dial, showing the per cent of grade on the dial attached to the head 6. Zero indicates level; numeral 1 indicates one per cent in 100 feet; numeral 2 indicates two per cent; 3, three per cent; and so on either up or down the desired grade. 7 is the level bulb set in the head which the instrument is set by. 8 is the slotted bar that holds the thumbnut 1 in position. This bar is fastened to the lower part of the head 6 as shown by the drawing. 9 is the body which has a hole in upper part which the pin or neck attached to the under part of the head 6 is inserted. This as the head is moved around turns in the body to any course you wish to follow. 10 is the band that is bolted through the legs to the body 9; as bolts are tightened this clamps the band to the lower part of the body 9 and also fastens the legs 11—12—13 to the body completing the tripod; 16 is the circle which is fastened to the body which as head is turned the lower end of the screw 2 follows the circle 16, each mark on the circle showing one degree of curve in 100 feet distance from the instrument.

I claim:

In a grade finding instrument, a body, a head pivoted thereto for movement about a vertical axis, a sight lever pivoted to said head for movement about a horizontal axis, a bar projecting from said head and bearing an adjusting nut, a screw connected to said lever and engaged by said nut whereby by turning the nut the lever may be tilted in a vertical plane, a movable pointer and a cooperating scale on said head, means connecting said pointer and lever for moving said pointer to indicate the adjustment of the lever, a horizontal annular graduated sector carried by said body and pointer means carried by said head and adapted to cooperate with the sector to indicate the orientation of said head and lever.

CECIL GROSS.